No. 642,620. Patented Feb. 6, 1900.
W. MATHER.
EVAPORATING APPARATUS.
(Application filed July 3, 1899.)

(No Model.) 3 Sheets—Sheet 3.

WITNESSES
Arthur A. Fisher
J. J. McCarthy

INVENTOR
William Mather
By Foster & Freeman
Attorneys

UNITED STATES PATENT OFFICE.

WILLIAM MATHER, OF MANCHESTER, ENGLAND.

EVAPORATING APPARATUS.

SPECIFICATION forming part of Letters Patent No. 642,620, dated February 6, 1900.

Application filed July 3, 1899. Serial No. 722,669. (No model.)

*To all whom it may concern:*

Be it known that I, WILLIAM MATHER, engineer, a subject of the Queen of Great Britain, residing at Salford Iron Works, Manchester, England, have invented certain new and useful Improved Means for Evaporating and Concentrating Liquid Solutions and in Obtaining Solid Substances from such Solutions, of which the following is a specification.

This invention relates to improved means for evaporating and concentrating liquid solutions or in obtaining in a solid state the salts or other substances previously held in solution.

The invention is applicable to solutions of various kinds, and the nature of the invention being described with reference to the concentrating of solutions of caustic soda and the obtaining therefrom of caustic soda in a solid or anhydrous state its application to solutions of other substances will be evident.

The ordinary method of concentrating caustic-soda solutions, so as eventually to secure solid or anhydrous caustic, is to run the comparatively weak liquor as it is formed by electrolytic or chemical processes into a large cast-iron evaporating-pan, called a "pot," which is built into a furnace, and by the direct application of the heat of the furnace to evaporate the water contained in the liquid alkali, after which the anhydrous liquid is scooped from the pot by ladles and placed in sheet-iron drums, in which it solidifies on becoming cold. The drums are then sealed with a cover and are ready for the market. The waste heat from the pot-furnace is often employed to surround a second pot or pan, called a "boat-pan," into which weak liquid may be first received on its way to the pot and where it undergoes a partial evaporation. This preliminary or partial concentration is sometimes effected by a special evaporator, in which the liquid is passed through a multitubular apparatus heated by steam, while the liquid is subjected to a vacuum in the tubes to increase the effect of the steam heat. According to this invention the weak caustic solution may be concentrated to any desired extent and be reduced to a solid state by a continuous process, and to clearly explain how this may be done reference is made to the accompanying drawings, in which—

Figure 1:
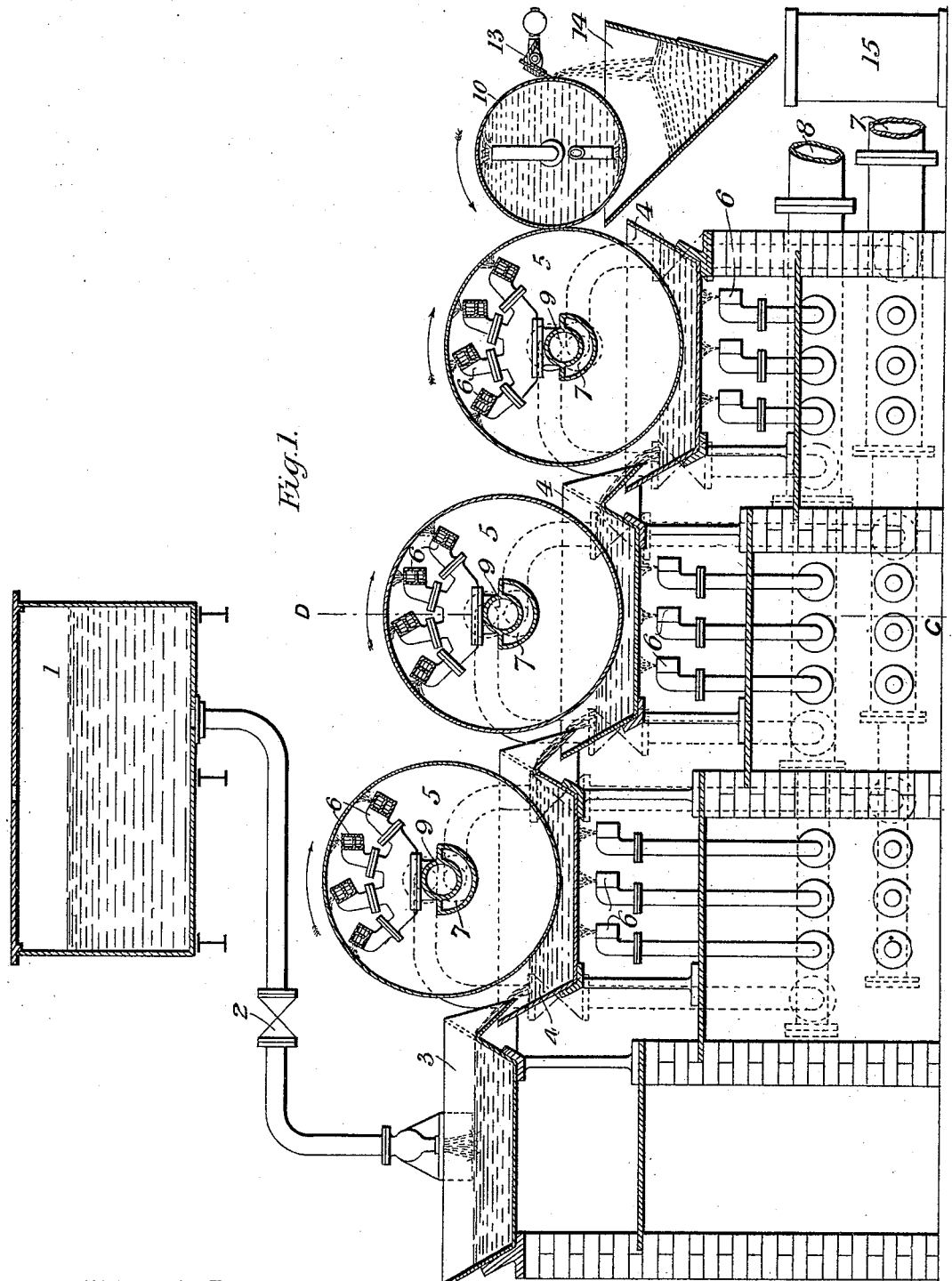
Figure 2:
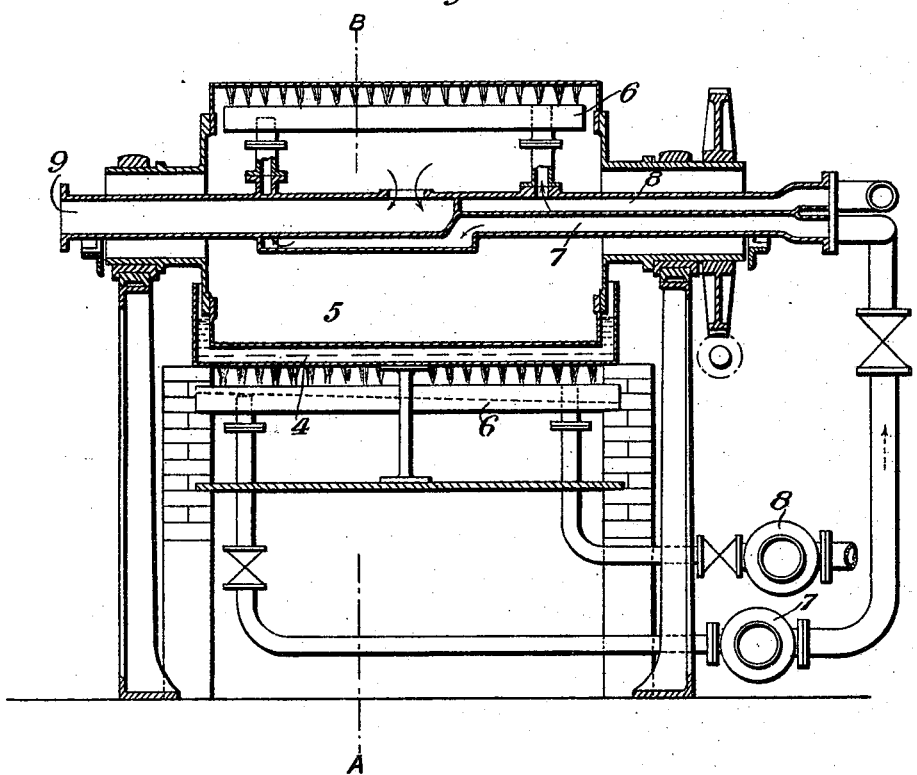
Figure 3:
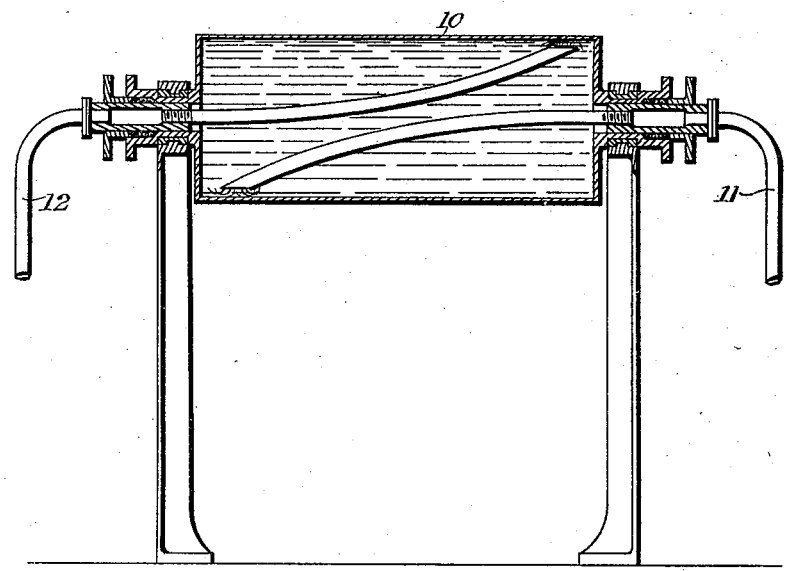

Figure 1 represents in side sectional elevation an apparatus for carrying out the invention, the section being on line A B of Fig. 2, which is a sectional elevation through one of the evaporating cylinders and pans and is taken on the line C D of Fig. 1, while Fig. 3 is a sectional elevation of the stripping or chilling cylinder, showing the preferred arrangement of water inlet and outlet therefrom.

As shown in the drawings, the weak or comparatively weak caustic solution is fed from tank 1 through valve 2 in regulated quantity to a trough 3, provided with an overflow-lip, over which the caustic quietly flows to the first of the evaporating-troughs 4, in which a hollow cylinder 5 is continuously revolving. The trough 4 is heated so as to maintain the liquid at a considerable temperature, and the hollow cylinder is heated from within by oxyhydrogen gas or any other suitable source of heat, so that its exterior surface is considerably higher in temperature than that of the liquid in the trough.

The means for heating shown in the drawings consist of atmospheric burners 6, supplied with air and gas by pipes 7 and 8, the supply to the interiors of cylinders 5 being made through one trunnion, as most clearly shown in Fig. 2, while the waste gases escape by pipe 9 through the other trunnion; but it is obvious that any other suitable heating system may be employed. The surface of the cylinder 5 being partially immersed in the caustic liquid, in revolving its surface becomes covered with a film of the alkali. The effect of this is that the water contained in the film of caustic liquid upon the cylinder is very rapidly driven off as the cylinder revolves, and the whole of the liquid contained in the trough 4 becomes gradually more and more concentrated. This operation may be repeated by an overflow of the concentrated liquid in the first trough 4 passing to a second trough 4, heated in a similar way and having a similar revolving cylinder 5, and so on through any number of troughs containing cylinders that may be required for a given amount of concentration or for treating any given solution.

Where it is desired to produce solid caustic, the evaporation is continued until the film upon the surface of the first or other cylinder 5 of a series consists of anhydrous liquid caustic soda, which is removed from the surface of this cylinder as it revolves by a stripping-cylinder 10, revolving in the opposite direction, so as to produce the same face travel at what may be called the "point of contact." When dealing with caustic soda, it is preferable not to have absolute contact, but simply to adjust the stripping-cylinder 10 closely to the surface of the last hot cylinder 5. The stripping-cylinder 10 is also hollow and is chilled or kept cool by a continuous stream of cold water flowing therethrough or by other means. As shown in Fig. 3, cylinder 10 has an inlet-pipe 11 passing through one trunnion and delivering the water near the bottom of the cylinder, while the outlet-pipe 12 passes through the other trunnion and terminates near the top of the cylinder. The cold cylinder 10, coming almost into contact with the last hot cylinder, makes contact with and collects most of the film upon the surface of the latter, and this film passing directly to the surface of the cold cylinder is immediately reduced to a solid state and covers the cold cylinder 10 with a fine film of anhydrous caustic soda, which is continually stripped from the cylinder by a "doctor" or like blade 13. The film of pure white caustic soda is thus broken up into the form of powder or fine shells and as it falls is received into hopper 14, from whence it may be packed into drums 15, ready for shipment.

An essential condition to the success of these operations is that all the metallic parts of the apparatus in contact with the liquid shall be of a material or be coated with a surface which will not injuriously affect or be affected by the particular liquid being treated and which shall be capable of standing the heat which is to be applied.

It may be noted among the advantages of this process and arrangement of apparatus that as the film is taken from the hot cylinder by the cold cylinder all scraping of hot cylinders by a doctor is obviated, and consequently the surface of such hot cylinder may be of expensive metal, if necessary, as there is practically no wear and tear or scraping action thereon.

If it be desired to hasten the evaporation and concentration, one or more cylinders and pans may be inclosed in a vacuum-chamber.

What is claimed is—

1. The improved apparatus for evaporating and concentrating liquid solutions, consisting of a roll revolving in contact with the bath of liquid to be evaporated, means for heating both the roll and the bath, a further roll or chilling-cylinder adapted to take the film left by the evaporation of the solution from the heated roll, means for keeping such chilling-cylinder cold, and a doctor for removing such film from the cold cylinder.

2. The improved apparatus for evaporating and concentrating liquid solutions, consisting of a series of rolls revolving in contact with the liquid in a corresponding series of baths through which the liquid successively passes to the last bath, means for heating both the rolls and the baths, a further roll or chilling-cylinder adapted to take the film left by the evaporation of the solution from the last heated roll, means for keeping such chilling-cylinder cold, and a doctor for removing such film from the cold cylinder.

In testimony whereof I have hereunto set my hand in the presence of two subscribing witnesses.

WILLIAM MATHER.

Witnesses:
EDMUND BRITTON,
JAMES WILLIAM BRITTON.